(12) United States Patent  
Kanade et al.

(10) Patent No.: US 8,427,557 B2  
(45) Date of Patent: Apr. 23, 2013

(54) SYSTEM WHICH ALTERNATES BETWEEN DISPLAYING AND CAPTURING IMAGES

(75) Inventors: Udayan Kanade, Pune (IN); Balaji Ganapathy, Pune (IN)

(73) Assignee: I2iC Corporation, Foster City, CA (US)

( * ) Notice: Subject to any disclaimer, the term of this patent is extended or adjusted under 35 U.S.C. 154(b) by 1099 days.

(21) Appl. No.: 12/302,324

(22) PCT Filed: May 25, 2007

(86) PCT No.: PCT/IB2007/051973  
§ 371 (c)(1),  
(2), (4) Date: Nov. 25, 2008

(87) PCT Pub. No.: WO2007/138536  
PCT Pub. Date: Dec. 6, 2007

(65) Prior Publication Data  
US 2009/0180009 A1 Jul. 16, 2009

(30) Foreign Application Priority Data  
May 25, 2006 (IN) .......................... 799/MUM/2006

(51) Int. Cl.  
*H04N 7/14* (2006.01)  
*H04N 5/217* (2006.01)  
*G03B 21/26* (2006.01)

(52) U.S. Cl.  
USPC .... 348/241; 348/14.08; 348/14.1; 348/14.16; 348/211.12; 348/222.1; 348/239; 353/28; 353/37; 346/107.2; 345/7

(58) Field of Classification Search ............... 348/14.02, 348/14.08, 14.09, 14.1, 14.16, 211.12, 222.1, 348/239, 241, 333.01–333.13; 353/28, 37; 346/107.2; 345/7  
See application file for complete search history.

(56) References Cited

U.S. PATENT DOCUMENTS 4,928,301 A 5/1990 Smoot  
2005/0024489 A1* 2/2005 Fredlund et al. ................ 348/61

FOREIGN PATENT DOCUMENTS

EP 0385128 A2 9/1990  
JP 1-286592 A 11/1989  
WO PCT/IB2007/051973 5/2007

* cited by examiner

*Primary Examiner* — Evelyn A. Lester

(57) ABSTRACT

A combined video display and image capture system and method are disclosed. In one embodiment the system alternates between the capture period of the camera (306) and the image display (302) period to isolate the camera (306) from the display (302). Various methods are disclosed to achieve the alternation in the capture and the display periods of the system. Distortions in the captured image can be corrected using an image correction subsystem.

8 Claims, 5 Drawing Sheets

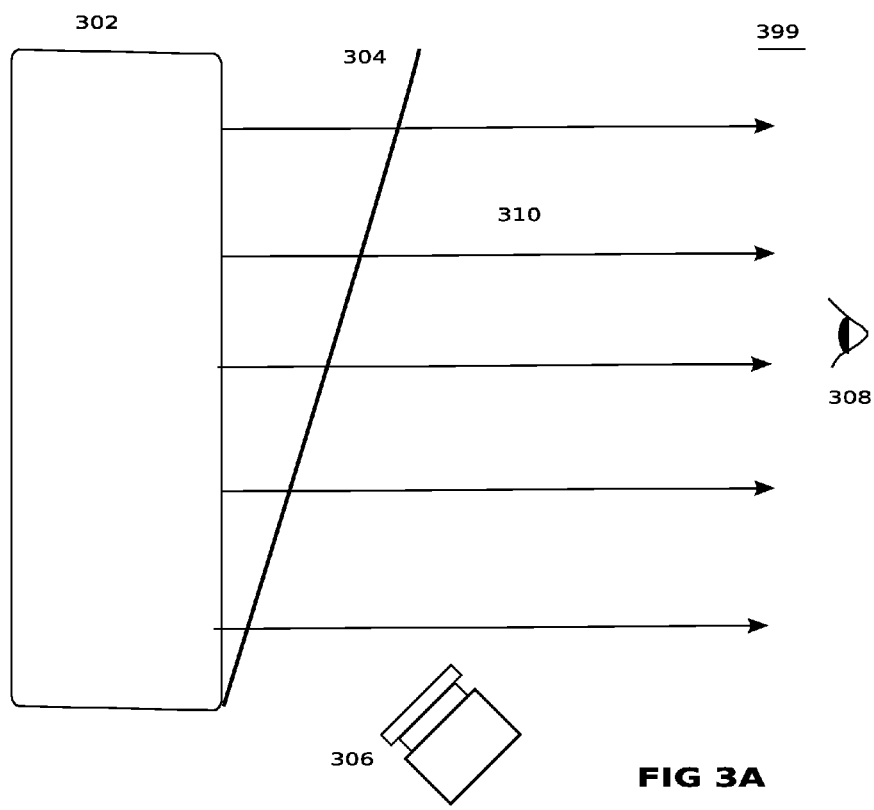

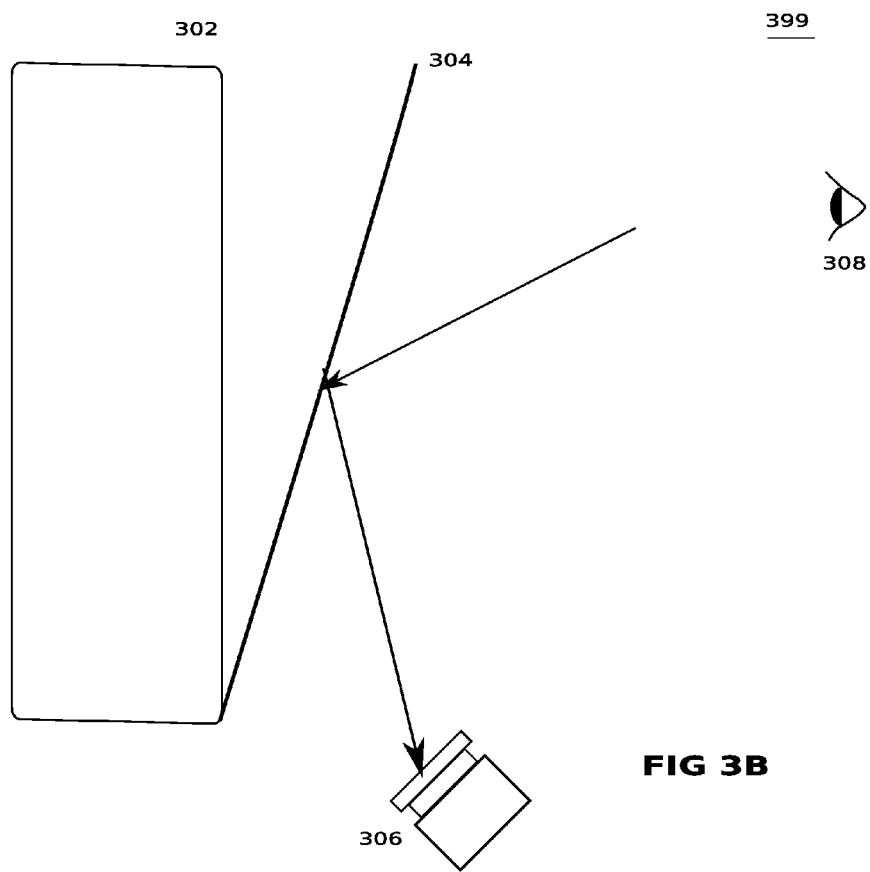

SYSTEM WHICH ALTERNATES BETWEEN DISPLAYING AND CAPTURING IMAGES

The present application claims the benefit of and priority to Indian Provisional Patent Application No. 799/MUM/2006 entitled 'System which Alternates between Displaying and Capturing Images' and filed on 25 May 2006.

FIELD OF INVENTION

The present invention relates to systems with displays and cameras. Particularly, the invention relates to an apparatus to isolate the display from the camera in systems with displays and cameras.

BACKGROUND

Combined video display and image capture systems find many uses in the art. One such system, is the teleprompter system, which is used in television production. The teleprompter system is a combined video capture and display system which enables the speaker who is being captured on the camera to simultaneously see the intended video display on the display screen. The teleprompter system enables the speaker to look into the camera while he speaks.

FIG. 1 illustrates a prior art teleprompter system 199. The viewer 108 views the image to be displayed on the display screen 102 through the partial mirror 104 and the viewer's image is captured by the camera 106 using the reflected light from the mirror 104. The camera 106 has to be kept such that the display 102 is not captured by the camera 106. This places design restrictions on the system, and causes the system to be bulky, or limits the field of view of the camera 106.

Combined video capture and display systems may also be used in other applications. One such application is video conferencing, where remote conferees can see each other during the conference.

SUMMARY

A combined video display and camera system and method are disclosed. In one embodiment the system alternates between the capture period of the camera and the image display period to isolate the camera from the display. Various methods are disclosed to achieve the alternation in the capture and the display periods of the system.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

FIG. 3A illustrates a block diagram of an exemplary combined video display and image capture system during the time period when an image is displayed, according to an embodiment of the present invention.

FIG. 3B illustrates a block diagram of an exemplary combined video display and image capture system during the time period when an image is captured, according to an embodiment of the present invention.

DETAILED DESCRIPTION

Figure 1:
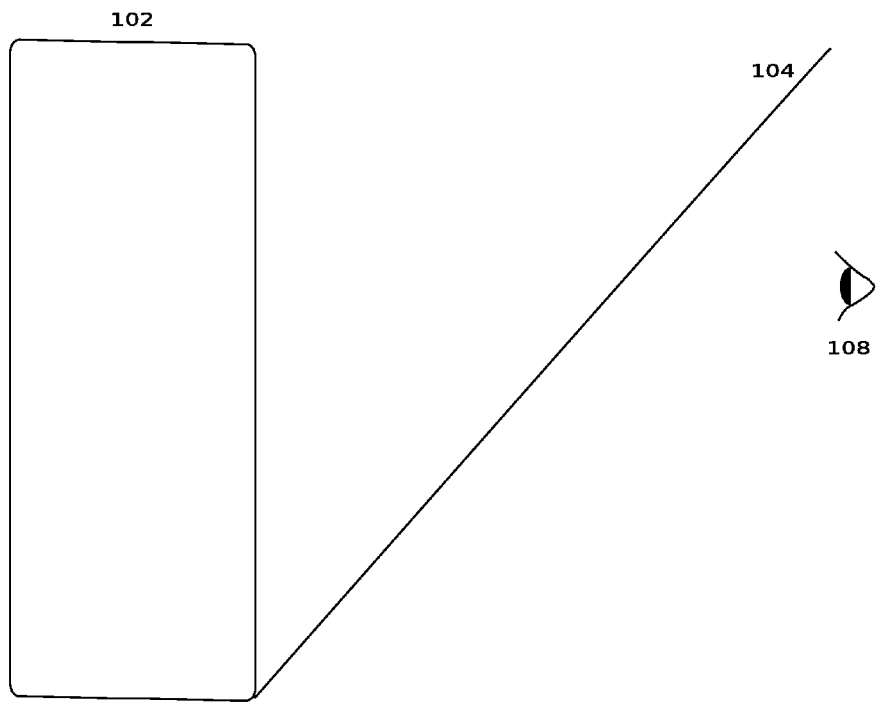
FIG. 1 illustrates a prior art teleprompter system.
Figure 2:
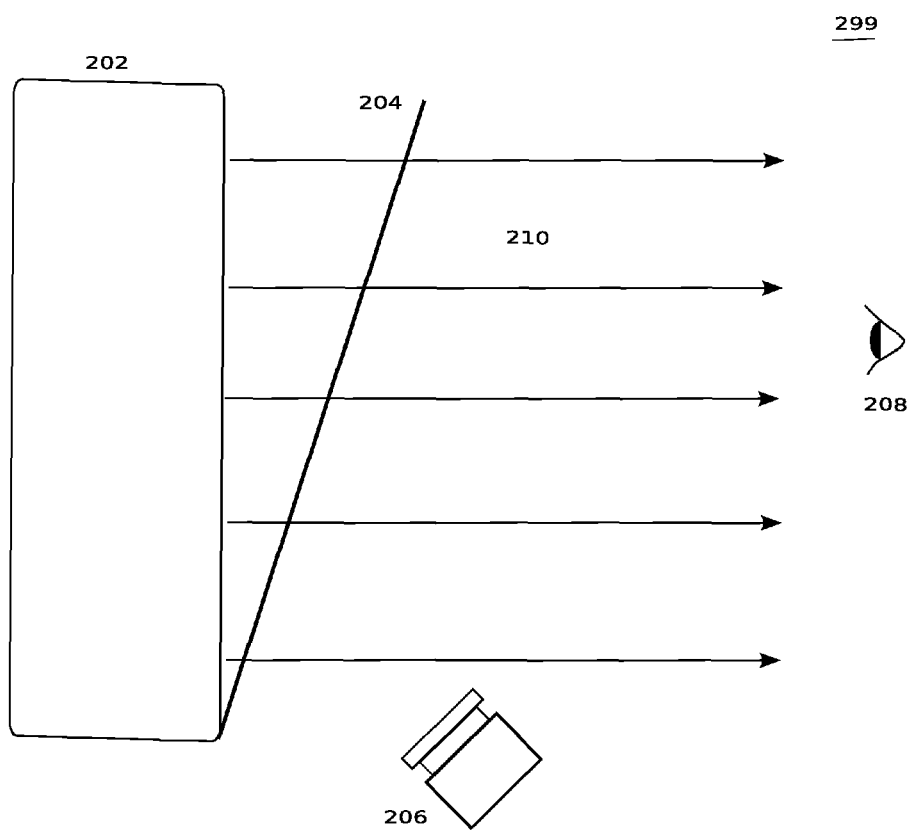
FIG. 2 illustrates a block diagram of an exemplary combined video display and image capture system, according to an embodiment of the present invention.

FIG. 2 illustrates a block diagram of an exemplary combined video display and image capture system 299, according to an embodiment of the present invention. An image is displayed on the display 202. The light 210 emanating from the display 202 enables the viewer 208 to view the image displayed. The light from the user 208 is reflected from the partial mirror 204 and falls on the camera 206. Camera 206 captures an image of the user 208 reflected in the partial mirror 204.

System 299 displays images and captures images in separate periods of time, where the image display period and image capture period occurs in a rapidly alternating sequence. The frequency of alternating of the periods is so fast that the eye observing the screen does not perceive a flicker. The human eye cannot perceive flickers which occur at a rate faster than about 40 Hz. The display 202 may be a cathode ray tube display, a liquid crystal display, any backlit display, organic LED display, flexible display or any other form of display.

The alternation of the display and capture periods of the system 299 reduces the amount of display light 210 affecting the image recorded by camera 206. Thus, the camera 206 can be placed in an orientation facing or partly facing the display 202. The design restriction of traditional systems, wherein the camera and display have to be placed such that the camera does not see the display is hence removed. In an embodiment, the camera 206 partly or completely facing the display 202 makes the system more compact. In another embodiment, the camera 206 partly or completely facing the display 202 allows the camera 206 being placed closer to partial mirror 204, creating a larger field of view.

FIG. 3A illustrates a block diagram of an exemplary combined video display and image capture system 399 during the time period when an image is displayed, according to an embodiment of the present invention. The display is turned on either by turning on the light source illuminating the display or by other means. The image displayed on the display 302 is perceived by the user 308. During this time period, the camera 306 is not recording an image.

FIG. 3B illustrates a block diagram of an exemplary combined video display and image capture system 399 during the time period when an image is captured, according to an embodiment of the present invention. The display 302 is turned off by turning off the light source illuminating the display or by other means. The camera 306 records an image of the user 308 from the user's reflection in the partial mirror 304. Since the display is turned off, the light from the display 302 does not enter the camera 306 and hence the camera 306 captures a clear image of the user 308.

The display 302 can be a display using a light source. The light source alternates between off and on (i.e. between light output and no light). In an embodiment, this light source may be a fluorescent light source. Fluorescent lights have the ability to alternate quickly between outputting light and not outputting light. Fluorescent lights are used to light flat panel display backlights. It is possible to vary the duty cycle of the light and dark states.

In an embodiment, the light source used for the display may be one or more LED light sources. The alternation between the light and dark states of the display is achieved by turning the LED light sources on and off in rapid succession.

In an embodiment, the light source used could be an incandescent source. Incandescent light sources cannot be switched very fast between light and dark states. The illumination from incandescent light sources may be caused to alternate between light and dark by using obstructions in between the light source and the display. The obstructions may be fast switching mechanical shutters or a spinning disc with holes in it at desired intervals.

Other types of displays which do not use light sources can also be switched on and off using various electronic means. In an embodiment, the display is a cathode ray tube screen. An electron beam traces the screen in a CRT display. The part of the screen where the electron beam hits is illuminated. The electron beam repeatedly traces the entire CRT display. The capture can be done when pixels facing the camera are not being traced and hence the distortions due to them are at a minimum.

In an embodiment, the display is an organic LED display or other emissive display. The display is switched off and on at the rate of alternation of the display and capture periods. This can be done by electronic control.

In an embodiment, a light source and its driving electronic circuitry are arranged such that the fraction of time for which the light source is on is kept as small as possible. This allows for maximum time to be allotted to capturing the image with the camera 306, and thus increases the sensitivity of the camera 306.

The camera 306 continuously switches between image recording mode and the mode wherein the light falling on the input aperture of the camera 306 has no effect on the camera 306, hereinafter referred to as non-recording mode. In one embodiment, this is achieved by using an obstruction near the input aperture of the camera 306 which alternates at a high frequency between transparent and opaque. In another embodiment, the camera 306 is an electronic camera such as a CCD camera and the alternating obstruction is achieved using an electronic shutter. When electric potential is applied to the pixels of the image recording plane of the electronic camera, charge is accumulated on each pixel corresponding to the light falling on the pixel. When the electrical potential is removed light falling on the recording plane has no effect. High frequency switching between recording and non-recording mode for an electronic camera 306 may be achieved by alternately applying and removing the electric potential.

The time between application and removal of the electric potential is an exposure. After the electric potential is applied and removed the amount of charge accumulated in each pixel position is recorded, i.e. an image is captured per exposure. For very short exposures it may not be possible to accumulate enough photons in a single exposure to accurately estimate the intensities at each point. In such a case, a single image is recorded after many exposures. Thus, electric potential is applied and removed many times, causing the camera to switch between recording and non-recording mode many times. After a certain fixed number of exposures, the amount of charge accumulated at each pixel position is measured and recorded. Choosing the number of exposures after which an image is recorded achieves exposure control, i.e. controlling the total amount of time for which the pixels are exposed for the capturing of a single image. In an alternate embodiment, choosing the exposure time of each exposure achieves exposure control. Exposure control is a feature in cameras to achieve more control over the image recorded. Automatic exposure control is achieved by choosing the exposure time based upon the intensity of the previous image captured, or other light measurements. Cameras capture images at a fixed image rate. After the requisite number of exposures for the capture of an image occurs, the camera shutter is kept in non-recording mode until the next image is recorded. During this extended non-recording mode, the charge accumulated at each pixel position is recorded.

Non-CCD cameras, non-electronic cameras and film based camera may also be used. In the case of a film based camera, to achieve multiple exposures per image capture the film frame is advanced after switching multiple times between recording and non-recording mode. This may require, similar to the case of the electronic camera, fast switching between the recording and non-recording mode, followed by an extended non-recording mode during which the film is advanced. Two serially placed apertures may also be used, one for keeping the light from the display 302 from entering the camera and one to allow frame advance.

The switching between the light and dark states of the display 302 and the switching between the recording and non-recording mode of the camera 306 are synchronised such that the camera 306 is in the recording mode only when the display 302 is dark. Both the camera and display states are controlled by a single electronic oscillator and control circuit. In the case that the display uses a light source and the alternating apertures for the light source and the camera are discs with holes, both the discs are driven by a single mechanical shaft. Alternatively, a single disc with holes is provided, and positions of the light source and camera are arranged such that either the light source is on or the camera is recording.

A fluorescent or LED light source may be used for the display illumination together with an electronic camera. According to one embodiment, a single electronic circuit having a single oscillator controls both the light source and the electronic camera.

To further reduce costs, one may substitute a light source which can alternate between light and dark, but whose dark period is not a small fraction of the total time, but a large fraction of it. In this case, the synchronization mentioned above is adjusted such that a minimum possible light from the display 302 enters the camera 306.

In another embodiment of the present invention, the duration of the capture and display phases of the system can be varied adaptively according to the nature of the image to be displayed on the display 302. If the displayed image is not very bright, then shorter display periods can be used. In the case of displays with light sources, the light sources may be kept on for a shorter time, and this can be compensated by using higher pixel transparency.

The Image Correction System

Figure 4:
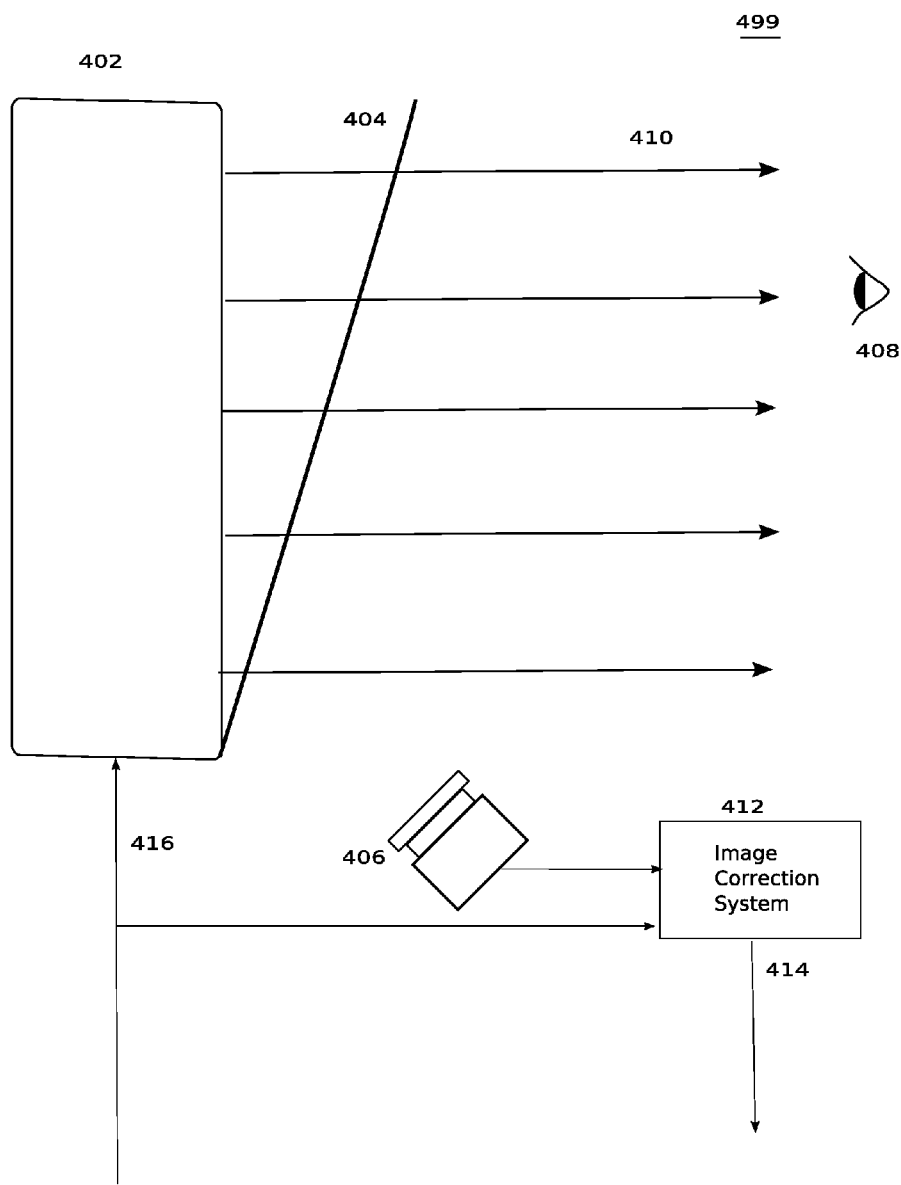
FIG. 4 illustrates a block diagram of an exemplary combined video display and image capture system comprising an image correction system, according to an embodiment of the present invention.

FIG. 4 illustrates a block diagram of an exemplary combined video display and image capture system 499 comprising an image correction system, according to one embodiment of the present invention. The image correction system 412 corrects defects in the image captured by camera 406. A part of the light from the display 402 falls on the camera 406 if the display is not completely switched off during the capture period of the camera. There are distortions in the captured image due to the image being displayed on the display 402. The distortions caused in the captured image are rectified using the image correction system 412. The signal 416 is the signal having the values of the pixels of the image to be displayed. This signal is given to the image correction system 412 for estimating the effect of the displayed pixels.

Image correction system 412 corrects the defects in the captured image by subtracting the effects of the displayed image. The correction required at each captured pixel is estimated using the values of the pixels of the image being displayed on display 402 and their relation with the pixels of the camera. This estimation is done per pixel of the displayed image as a function of the time overlap between the display phase and the capture phase. This estimation can in done by many ways. In an embodiment, this estimation is done experimentally. Various known images are displayed on the display 402 and captured by the camera 406. The results are used for the estimation. For example, the displayed images may be images wherein a single display pixel is illuminated. From a single such image, the effect due to the illuminated pixel on all the pixels of the captured image is estimated.

If the value of a displayed pixel changes during a capture phase, the average value of the displayed pixel over the duration of the capture phase may be calculated and used to estimate the effect of the displayed pixel. In an embodiment, the display 402 is a CRT display. During the capture phase, the value of a displayed pixel reduces over time. The average value of the pixel over the duration of the capture phase is calculated and used for estimation.

Minimizing Flicker Due to Other Light Sources

It is frequently the case that the objects whose image is to be captured by the camera are themselves illuminated by a regularly alternating external light source such as fluorescent light. Further, there is also the possibility of other displays within the field of view, these displays having their own frequencies of light emanation (both CRT and LCD displays exhibit this behavior). Such flickering light may cause a frequency aliasing effect when sampled through the high frequency capture periods of the camera. The effect of this aliasing on the captured images would be a low frequency oscillation in the illumination due to that particular light source.

In one embodiment of the present invention, switching between capture and display periods is synchronized with the illumination due to the alternating light source, preferably such that the present system is in the capture period at the same time that the alternating external light source is illuminating the object whose image is to be captured. This eliminates the aliasing effect, and has the added benefit of a large amount of the illumination reaching the camera. Synchronization may be achieved by synchronizing with the alternating mains power, which is usually driving the switching of the external light source, or by using a phase locked loop to lock into the frequency of the light source. The phase locked loop may use a photo-sensor or feedback from the camera to achieve phase lock. In another embodiment, the switching frequency is a multiple of the frequency of switching of the external light source, or vice versa.

In another embodiment, the aliasing effect is minimized by alternating between the capture and display periods at a very fast frequency compared to the frequency of switching the external light source off and on. Because of the higher sampling rate, the effect of aliasing is reduced. The residual aliasing effect causes a low frequency periodic change in the illumination of the captured image. Such periodic change is detected and cancelled out by the image correction system 412. The period of the frequency change is predicted by detecting the mains power frequency and subtracting the whole fraction of the switching frequency between the capture and display periods that are closest to it.

To minimize flicker from high frequency light sources, the sequence of alternating between capture and display periods is randomized. The amount of time the system remains in each of the two phases of displaying an image and capturing an image is decided randomly based on some random or pseudorandom sequence of numbers. In many cases, the amount of time the display can remain on is limited. In such cases the randomization relates to the period between two illumination times of the display. The random sequence is arranged such that the average illumination of the display is the chosen average illumination for the display, such that no flicker is perceived by the human eye considering the principle of persistence of vision, and each image being captured is exposed for the requisite time. The randomization in the sequence breaks up the symmetry of sampling and greatly reduces the effects of aliasing.

Correcting for Non-Linearity of Capture and Display Mechanism

Many image display mechanisms and image capture mechanisms have a non-linear response. This causes the relation between the values of the pixels affecting the captured image and the effects due to these pixels to be non-linear. Though these relations are linear as far as the transparency values of the screen to the intensities at the camera pixels are concerned, the non-linear complications arise because the transparency of a screen pixel is not a linear function of the input pixel value, and because the pixel value recorded by the camera is not a linear function of the intensity incident at that pixel. To reduce or remove the non-linear effects, the image correction system 412 first operates on the captured image with the inverse of the non-linear function for the camera, to get a record of pixel values which are linearly related to the intensities of light incident at those pixels. Also, before the effect of the pixels is calculated, the relevant pixels of the image to be displayed upon the screen are operated upon (computationally) by the same non-linear function as the non-linear function of the screen, to get an estimate of the transparency of each affecting pixel.

The invention claimed is:

1. A system comprising:
a camera, a partial mirror and a video display wherein,
the camera is configured to capture an image reflected in the partial mirror during a plurality of capture periods and not capture an image during a plurality of non-capture periods,
the video display is configured to display an image during at least a part of more than one of the non-capture periods,
the capture periods and the non-capture periods alternate continuously, and
a viewer views the video display through the partial mirror.

2. The system of claim 1, wherein the durations of non-capture and the capture periods are fixed.

3. The system of claim 1, wherein the durations of non-capture and the capture periods are adaptively varied depending on the brightness of the image to be displayed.

4. The system of claim 1, wherein the video display is configured to display an image during a part of more than one of the capture periods.

5. The system of claim 4, further comprising an image corrector that corrects defects in the captured image due to the camera capturing some light emanated by the video display during a part of more than one of the capture periods.

6. The system of claim 1, wherein the video display is configured to emit light during a part of more than one of the non-capture periods and not emit light during a part of more than one of the capture periods.

7. The system of claim 6, wherein the video display is a backlit display using a light source for illumination and can be alternated into light and dark states.

8. The system of claim 7, further comprising a light blocking mechanism that blocks light from the light source during at least a part of more than one of the capture periods.

* * * * *